United States Patent
Nomura et al.

(10) Patent No.: US 9,424,469 B2
(45) Date of Patent: Aug. 23, 2016

(54) DIFFERING REGION DETECTION SYSTEM AND DIFFERING REGION DETECTION METHOD

(75) Inventors: Toshiyuki Nomura, Tokyo (JP); Kota Iwamoto, Tokyo (JP); Ryota Mase, Tokyo (JP); Naotake Fujita, Tokyo (JP); Ryosuke Takai, Tokyo (JP); Takato Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 370 days.

(21) Appl. No.: 13/983,932

(22) PCT Filed: Nov. 28, 2011

(86) PCT No.: PCT/JP2011/077376
§ 371 (c)(1),
(2), (4) Date: Aug. 6, 2013

(87) PCT Pub. No.: WO2012/108088
PCT Pub. Date: Aug. 16, 2012

(65) Prior Publication Data
US 2013/0322696 A1    Dec. 5, 2013

(30) Foreign Application Priority Data
Feb. 10, 2011   (JP) .................................. 2011-027429

(51) Int. Cl.
*G06K 9/00* (2006.01)
*G06T 7/20* (2006.01)
(Continued)

(52) U.S. Cl.
CPC ........ *G06K 9/00624* (2013.01); *G06K 9/00751* (2013.01); *G06K 9/3266* (2013.01); *G06K 9/4604* (2013.01); *G06T 7/2033* (2013.01); *G06T 2207/10016* (2013.01)

(58) Field of Classification Search
None
See application file for complete search history.

(56) References Cited

U.S. PATENT DOCUMENTS 5,436,653 A  * 7/1995 Ellis .................. G06K 9/00711
                                                      725/19
6,937,773 B1 * 8/2005 Nozawa ............... H04N 19/139
                                                      375/240.08
(Continued)

FOREIGN PATENT DOCUMENTS

CN          101473657 A       7/2009
JP         2000-242795 A      9/2000
(Continued)

OTHER PUBLICATIONS

Translation of Communication dated Apr. 3, 2015, issued by the State Intellectrual Property Office of the People's Republic of China in counterpart Application No. 201180066973.X.
(Continued)

*Primary Examiner* — Nancy Bitar
(74) *Attorney, Agent, or Firm* — Sughrue Mion, PLLC

(57) ABSTRACT

The present invention enables detection of a local differing region between images. Inter-image difference information indicating a difference in feature amounts for each subregion between first and second images is generated based on a first feature amount vector that is a set of feature amounts respectively corresponding to a plurality of subregions in the first image and a second feature amount vector that is a set of feature amounts respectively corresponding to a plurality of subregions in the second image, a differing region that is an image region that differs between the first and second images is detected based on differences in the respective subregions indicated by the inter-image difference information, and detection information that indicates a result of the detection is outputted.

13 Claims, 17 Drawing Sheets

(51) Int. Cl.
*G06K 9/32* (2006.01)
*G06K 9/46* (2006.01)

(56) References Cited

U.S. PATENT DOCUMENTS

| | | | | |
|---|---|---|---|---|
| 9,042,656 B2 * | 5/2015 | Iwamoto | ............. | G06K 9/4642 382/115 |
| 2005/0105610 A1 * | 5/2005 | Sung | ............. | G06T 5/50 375/240.01 |
| 2006/0198443 A1 * | 9/2006 | Liang | ............. | H04N 19/139 375/240.16 |
| 2006/0204103 A1 * | 9/2006 | Mita | ............. | G06K 9/00248 382/190 |

FOREIGN PATENT DOCUMENTS

| | | |
|---|---|---|
| JP | 2005-202921 A | 7/2005 |
| JP | 2007-279813 A | 10/2007 |
| JP | 2008-282316 A | 11/2008 |
| WO | 2007/148264 A1 | 12/2007 |
| WO | 2010/084714 A1 | 7/2010 |

OTHER PUBLICATIONS

Communication dated Nov. 27, 2014 from the European Patent Office in counterpart application No. 11858173.5.

Iwamoto et al., "Response to the Call for Proposals on Video Signature Tools," NEC Corporation, Feb. 2009, pp. 1-9 (9 pages total).

Brasnett et al., "MPEG-7 Video Signature Tools," Mitsubishi Electric R&D Centre Europe, NEC Corp, Apr. 2009, pp. 1-8 (8 pages total).

Zhao et al., "Robust Hashing based on Persistent Points for Viedo Copy Detection," 2008 International Conference on Computational Intelligence and Security, 2008, pp. 305-308 (4 pages total).

Iwamoto et al., "Image Signature Robust to Caption Superimposition for Video Sequence Indentification," Media and Information Research Laboratories, NEC Corporation, 2006, pp. 3185-3188 (4 pages total).

Dagtas et al., "Models for Motion-Based Video Indexing and Retrieval," IEEE Transactions on Image Processing, Jan. 2000, vol. 9, No. 1, pp. 88-101 (14 pages total).

Zhong et al., "Face Image Retrieval System Using TFV and Combination of Subimages," Department of Information Technology, Tampere University of Technology, 2007, pp. 49-60, (12 pages total).

* cited by examiner

FEATURE AMOUNT STORING UNIT 21

| VIDEO IDENTIFIER | SEQUENCE INFORMATION | FEATURE AMOUNT VECTOR |
|---|---|---|
| 1 | 1 | (−1, +1, +1, 0, ⋯) |
| | 2 | (0, −1, 0, +1, ⋯) |
| | 3 | (0, +1, +1, 0, ⋯) |
| | 4 | (+1, 0, 0, +1, ⋯) |
| | ⋮ | ⋮ |
| 2 | 1 | (0, +1, 0, −1, ⋯) |
| | 2 | (+1, 0, 0, −1, ⋯) |
| | 3 | (0, −1, −1, 0, ⋯) |
| | 4 | (−1, −1, 0, +1, ⋯) |
| | ⋮ | ⋮ |
| ⋮ | ⋮ | ⋮ |

FIG. 5

FEATURE AMOUNT DB

| VIDEO IDENTIFIER | CREATION DATE/TIME | SEQUENCE INFORMATION | FEATURE AMOUNT VECTOR |
|---|---|---|---|
| 100 | JANUARY 26, 2011 | 1 | (−1, 0, +1, −1, ⋯) |
| | | 2 | (+1, −1, 0, −1, ⋯) |
| | | 3 | (−1, +1, +1, 0, ⋯) |
| | | 4 | (−1, 0, 0, +1, ⋯) |
| | | ⋮ | ⋮ |
| 101 | JANUARY 27, 2011 | 1 | (+1, +1, 0, −1, ⋯) |
| | | 2 | (+1, +1, 0, −1, ⋯) |
| | | 3 | (−1, −1, −1, 0, ⋯) |
| | | 4 | (−1, 0, 0, +1, ⋯) |
| | | ⋮ | ⋮ |
| ⋮ | ⋮ | ⋮ | ⋮ |

DIFFERENCE INFORMATION STORING UNIT

| INPUT VIDEO | | ORIGINAL VIDEO | | DIFFERENCE VECTOR |
|---|---|---|---|---|
| VIDEO IDENTIFIER | SEQUENCE INFORMATION | VIDEO IDENTIFIER | SEQUENCE INFORMATION | |
| 1 | 1 | 100 | 10 | (0, 0, 1, 0, ⋯) |
|  | 2 |  | 11 | (0, 0, 1, 0, ⋯) |
|  | 3 |  | 12 | (0, 1, 1, 0, ⋯) |
|  | 4 |  | 13 | (0, 0, 1, 1, ⋯) |
|  | ⋮ |  | ⋮ | ⋮ |
| ⋮ | ⋮ | ⋮ | ⋮ | ⋮ |

DETECTION INFORMATION STORING UNIT

| INPUT VIDEO | | ORIGINAL VIDEO | | DIFFERING REGION INFORMATION | DIFFERENCE INFORMATION | SIMILARITY INFORMATION |
|---|---|---|---|---|---|---|
| VIDEO IDENTIFIER | SEGMENT INFORMATION | VIDEO IDENTIFIER | SEGMENT INFORMATION | | | |
| 1 | 00:00~01:05 | 100 | 30:00~31:05 | — | 0 | 8 |
| | 01:05~01:25 | | 31:05~31:25 | REGION A REGION B | 3 | |
| | ... | | ... | ... | ... | |
| | 08:17~08:27 | | 38:17~38:27 | REGION C REGION D | 5 | |
| ... | ... | ... | | ... | ... | ... |

DIFFERING REGION DETECTION SYSTEM AND DIFFERING REGION DETECTION METHOD

CROSS REFERENCE TO RELATED APPLICATIONS

This application is a National Stage of International Application No. PCT/JP2011/077376 filed Nov. 28, 2011, claiming priority based on Japanese Patent Application No. 2011-027429, filed Feb. 10, 2011, the contents of all of which are incorporated herein by reference in their entirety.

BACKGROUND

The present invention relates to a differing region detection system and a differing region detection method.

The recent proliferation of video sites on the Internet has resulted in a deluge of illegal videos created from original videos, which has become a social issue. Examples of illegal videos include videos that are exact copies of an original video, videos created by extracting a part of an original video such as a highlight scene, and videos created by modifying an original video by adding a telop or the like thereto. In consideration thereof, there are demands for detection of a video having identity with a source video while also taking such modified videos into consideration.

For example, Patent Document 1 discloses a method of judging identity between two images. Specifically, with the method disclosed in Patent Document 1, a multidimensional feature amount vector is generated for each image, and feature amount vectors are compared between images in order to judge identity between the images. By applying such a method to, for example, a part of frame images in a video, identity between videos can be judged even if the videos has been modified.

Patent Document 1: WO 2010/084714

However, although the method disclosed in Patent Document 1 enables identity between videos to be judged as described above, when there is a local difference such as presence/absence of telops or a difference in contents of telops between videos judged to have identity, the method disclosed in Patent Document 1 does not enable a determination to be made regarding where the differing region is. For example, even if a telop-added video is judged by the method described above to be a video having identity with a source video, the video judged to have identity must be played back in order to check where the telop has been added, resulting in an significant increase in work load.

SUMMARY

The present invention has been made in consideration of such circumstances and an object thereof is to detect a local differing region between images.

A differing region detection system according to an aspect of the present invention comprises: a difference information generating unit configured to generate inter-image difference information indicating a difference in feature amounts for each subregion between first and second images based on a first feature amount vector that is a set of feature amounts respectively corresponding to a plurality of subregions in the first image and a second feature amount vector that is a set of feature amounts respectively corresponding to a plurality of subregions in the second image; and a differing region detecting unit configured to detect a differing region that is an image region that differs between the first and second images, based on differences in the respective subregions indicated by the inter-image difference information, and output detection information indicating a result of the detection.

Moreover, as used in the present invention, the term "unit" not only signifies physical means but also includes cases where functions of the "unit" are realized by software. In addition, functions of one "unit" or device may be realized by two or more physical means or devices, and functions of two or more "units" or devices may be realized by one physical means or device.

According to the present invention, a local differing region between images can be detected.

DESCRIPTION OF DRAWINGS

FIG. 5 is a diagram showing an example of a feature amount vector stored in a feature amount storing unit;

FIG. 12 is a diagram showing an example of detection information stored in a detection information storing unit;

DETAILED DESCRIPTION

Hereinafter, an embodiment of the present invention will be described with reference to the drawings.

Figure 1:
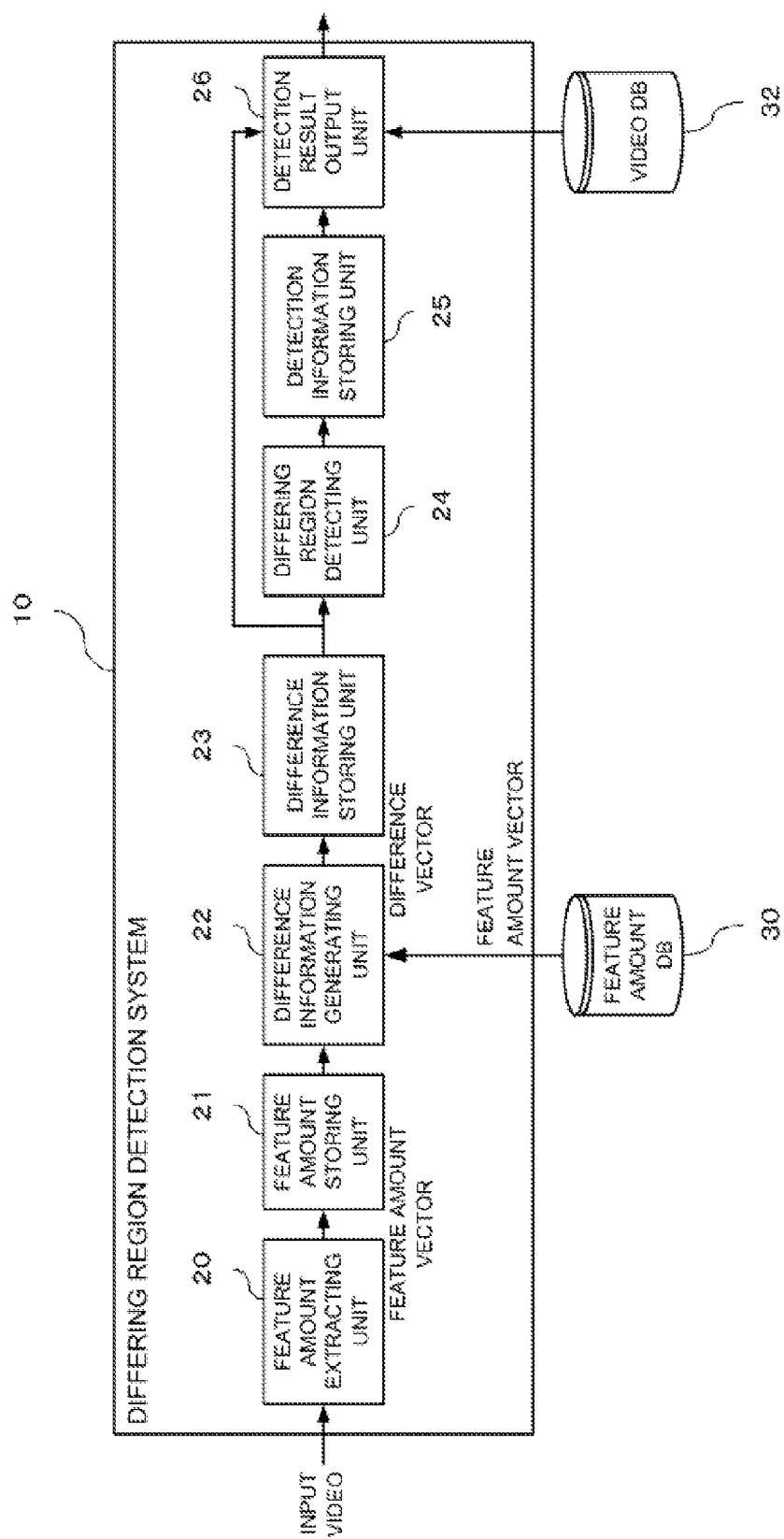
FIG. 1 is a diagram showing a configuration of a differing region detection system that is an embodiment of the present invention.

FIG. 1 is a diagram showing a configuration of a differing region detection system that is an embodiment of the present invention. A differing region detection system 10 is a system that detects a region with a local difference between videos having identity, and is configured so as to comprise a feature amount extracting unit 20, a feature amount storing unit 21, a difference information generating unit 22, a difference information storing unit 23, a differing region detecting unit 24, a detection information storing unit 25, and a detection result output unit 26. In the present embodiment, a local difference may also be referred to as a "local modification". In addition, the differing region detection system 10 refers to a feature amount database (DB) 30 and a video database (DB) 32. Moreover, the differing region detection system 10 is configured using one or a plurality of information processing devices, and the feature amount extracting unit 20, the difference information generating unit 22, the differing region detecting unit 24, and the detection result output unit 26 can be realized by having a processor execute a program stored in a memory. In addition, the feature amount storing unit 21 and the difference information storing unit 23 can be realized using a storage area of a memory, a storage device, or the like.

Figure 2:
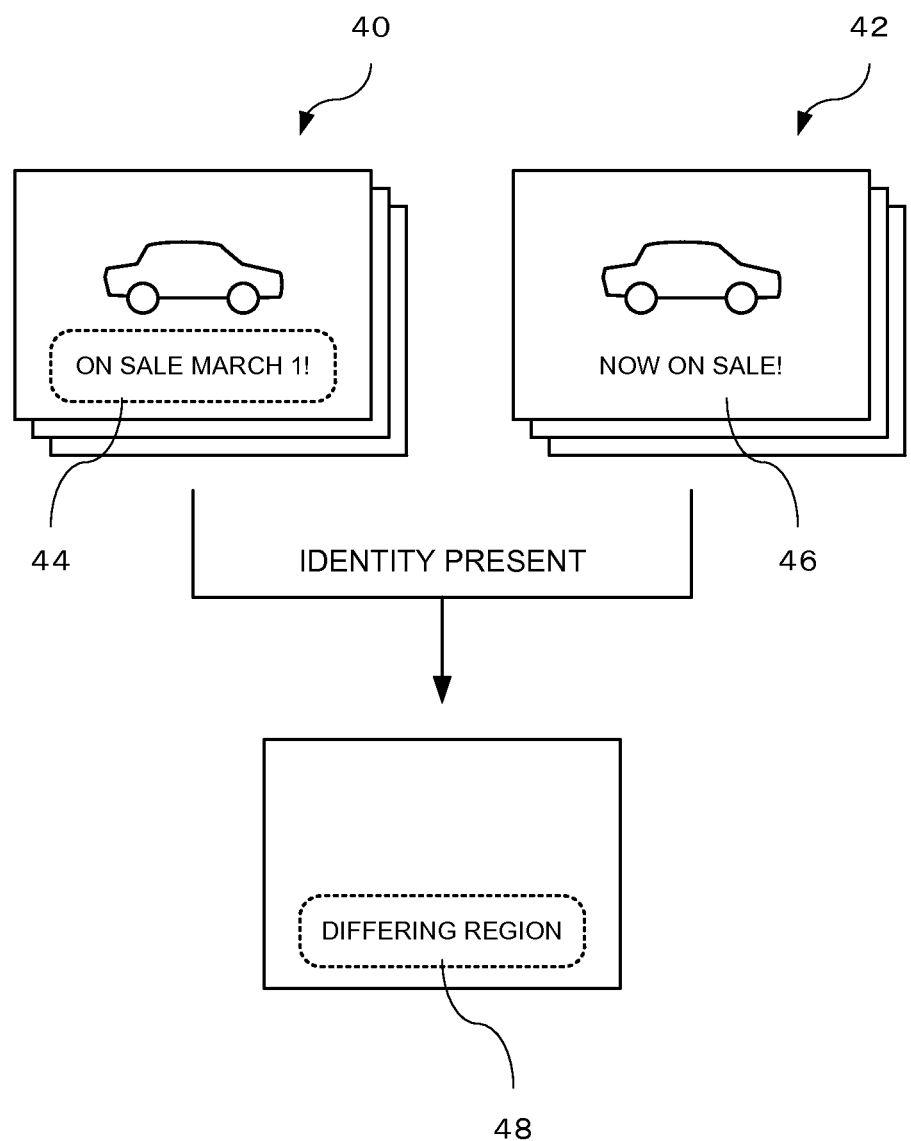
FIG. 2 is a diagram showing an example of a differing region detected by the differing region detection system.

FIG. 2 is a diagram showing an example of a differing region detected by the differing region detection system 10. In this case, a differing region refers to a region in which a local modification has occurred. FIG. 2 shows videos 40 and 42 which have identity. The video 40 is, for example, an advertisement video of an automobile that is about to be launched, and a subtitle reading "On Sale March 1!" is displayed in a lower image region 44 of a frame image constituting the video 40. On the other hand, the video 42 is an advertisement video of the same automobile to be broadcasted after the automobile goes on sale. As such, a subtitle displayed in a lower image region 46 of a frame image constituting the video 42 reads "Now On Sale!" Since the two videos 40 and 42 only differ from each other in contents of the subtitles, the videos overall are judged to have identity. In addition, with the differing region detection system 10, a differing region 48 between the videos 40 and 42 can be detected. In a similar manner, for example, regarding an illegal video generated from an original video, the differing region detection system 10 is capable of detecting a differing region that is a region in which a modification has been made to an original video.

Returning to FIG. 1, various units which constitute the differing region detection system 10 will now be described in detail.

The feature amount extracting unit 20 extracts a feature amount vector from each of a plurality of frame images that constitutes an input video and stores the feature amount vectors in the feature amount storing unit 21. In this case, for example, an input video refers to a video on the air or a video uploaded to a video site. A feature amount vector is a set of N-number (where N≥2) of feature amounts corresponding to N-number of subregions defined in a frame image and can be generated according to, for example, a method described in WO 2010/084714. Each subregion corresponding to each dimension of a feature amount vector includes, for example, a plurality of subregions in a frame image. In addition, a feature amount of each dimension can be generated based on, for example, a difference among feature amounts of a plurality of subregions corresponding to each dimension.

Figure 3:
FIG. 3 is a diagram showing an example of region splitting of a frame image.

FIG. 3 is a diagram showing an example of region splitting of a frame image. As shown in FIG. 3, for example, each frame image can be split into 32×32=1024 regions (split regions). A subregion corresponding to each dimension in a feature amount vector is constituted by a combination of one or more split regions.

Figure 4:
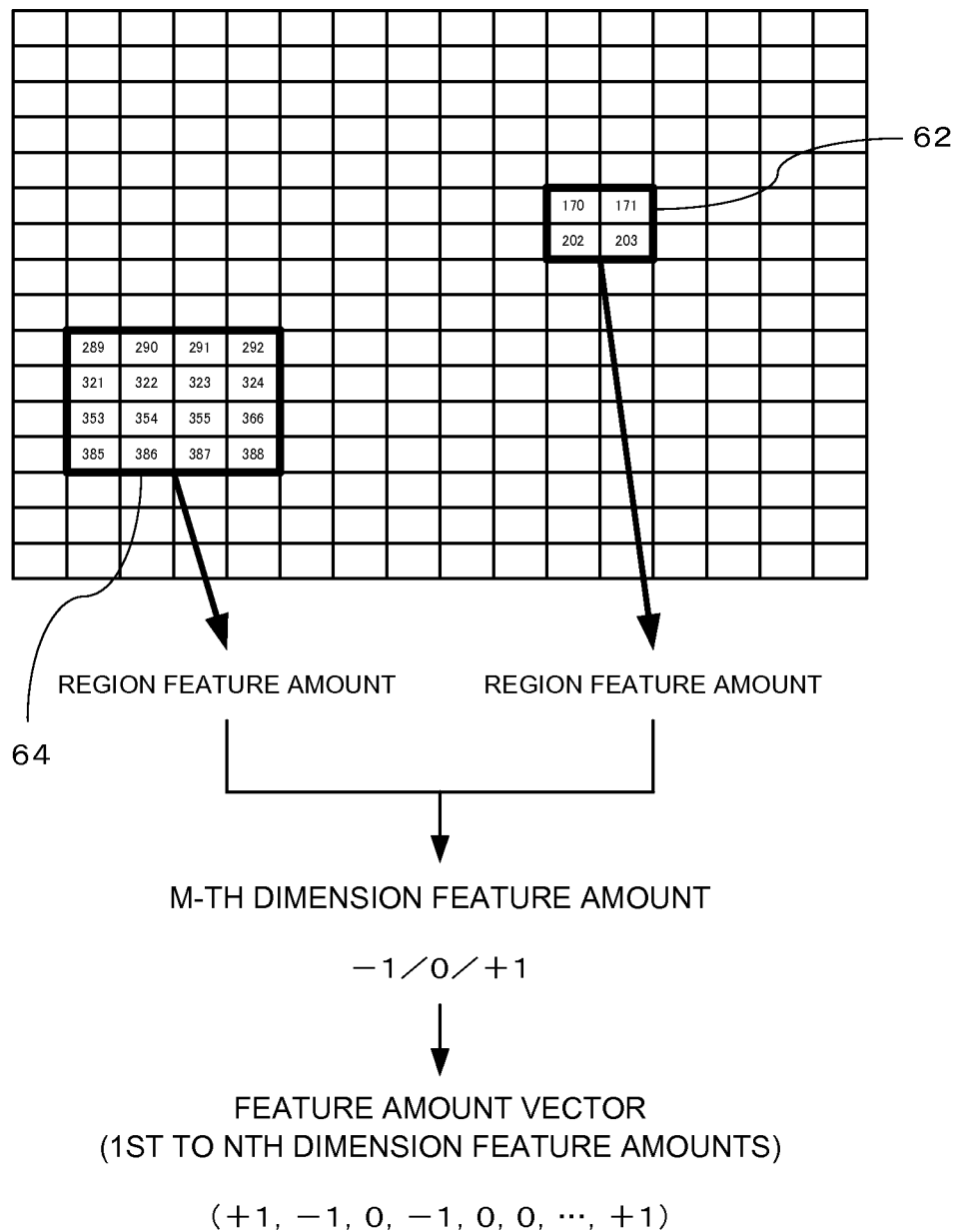
FIG. 4 is a diagram showing an image from which M-th dimension feature amounts are extracted.

FIG. 4 is a diagram showing an image from which M-th dimension feature amounts are extracted. In the example shown in FIG. 4, two subregions 62 and 64 correspond to the M-th dimension. In addition, the feature amount extracting unit 20 is capable of generating an M-th dimension feature amount based on a difference between a feature amount (region feature amount) of the subregion 62 and a feature amount (region feature amount) of the subregion 64. In this case, the feature amounts of the respective subregions 62 and 64 can be calculated by any method such as a method based on an average value or a median value of pixel values in the respective subregions. In addition, the feature amount extracting unit 20 can generate an M-th dimension feature amount by quantizing a difference between the region feature amounts of the subregions 62 and 64 into three values (−1, 0, 1). By generating a feature amount for each of the dimensions (first to N-th dimensions), the feature amount extracting unit 20 can generate an N-th dimension feature amount vector. It should be noted that the method of calculating a feature amount of each dimension as described above is merely an example and any method may be used as long as a feature amount vector is generated based on a feature amount of a subregion set for each dimension.

FIG. 5 is a diagram showing an example of a feature amount vector stored in the feature amount storing unit 21. As shown in FIG. 5, a feature amount vector is stored in association with a video identifier which identifies an input video and sequence information which indicates a chronological order of a frame image. In this case, a video identifier is for identifying a batch of videos and, for example, a video title, a program name, a file name, or a URL (uniform resource locator) can be used. In addition, sequence information may be any information which enables an order of a feature amount vector to be assessed and, for example, a frame number can be used. Moreover, a video identifier need not be used if there is only one inputted video. On the other hand, if a storage structure of data or the like enables a chronological sequence of a feature amount vector to be identified, sequence information need not be used.

Returning to FIG. 1, the difference information generating unit 22 compares a feature amount vector of an input video stored in the feature amount storing unit 21 with a feature amount vector stored in the feature amount DB 30 and generates a difference vector from feature amount vectors of videos with identity. Moreover, the difference information generating unit 22 is also capable of generating a difference vector by comparing feature amount vectors stored in the feature amount DB 30. In other words, with the differing region detection system 10, a differing region can also be detected among a plurality of videos whose feature amount vectors are stored in the feature amount DB 30.

Figure 6:
FIG. 6 is a diagram showing an example of a feature amount vector stored in a feature amount DB.

FIG. 6 is a diagram showing an example of a feature amount vector stored in the feature amount DB 30. The feature amount DB 30 stores feature amount vectors of a plurality of videos to be comparison objects with an input video. In the present embodiment, a video whose feature amount vector is stored in the feature amount DB 30 will be referred to as an original video. As shown in FIG. 6, a feature amount vector of an original video is stored in associated with a video identifier that identifies the original video, a creation date/time of the original video, and sequence information which indicates a chronological order of a frame image.

Figure 7:
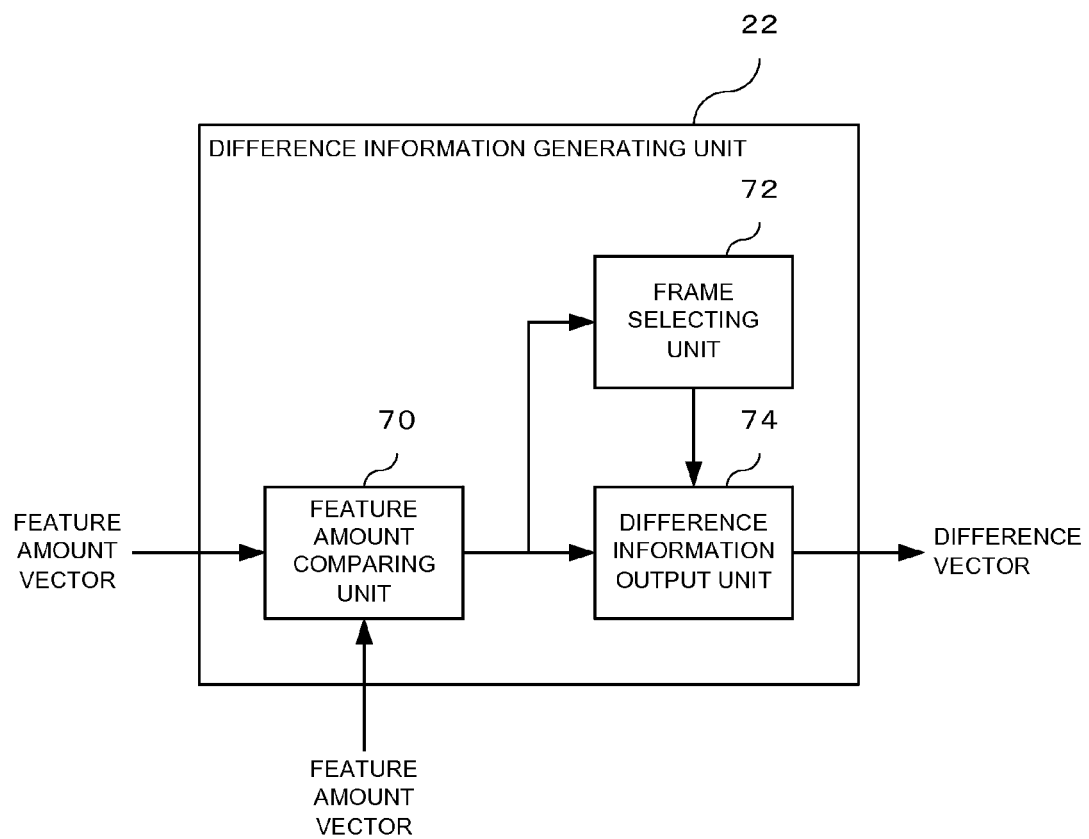
FIG. 7 is a diagram showing a configuration example of a difference information generating unit.

FIG. 7 is a diagram showing a configuration example of the difference information generating unit 22. As shown in FIG. 7, the difference information generating unit 22 can be configured so as to include a feature amount comparing unit 70, a frame selecting unit 72, and a difference information output unit 74.

For example, the feature amount comparing unit 70 compares a feature amount vector of an input video with a feature amount vector in the feature amount DB 30 for each frame. The frame selecting unit 72 selects a frame image judged to have identity between the input video and the original video based on a result of a comparison by the feature amount comparing unit 70. Moreover, a judgment of identity between frame images can be performed by, for example, comparing the number of dimensions with identical feature amounts or the number of dimensions with non-identical feature amounts between two feature amount vectors or comparing sizes of the two feature amount vectors. The difference information output unit 74 outputs difference region information indicating a dimension in which a difference of a feature amount is greater than a predetermined criterion. Specifically, the difference information output unit 74 generates a difference vector from a feature amount vector of a frame image selected by the frame selecting unit 72 and stores the difference vector in the difference information storing unit 23.

Figure 8:
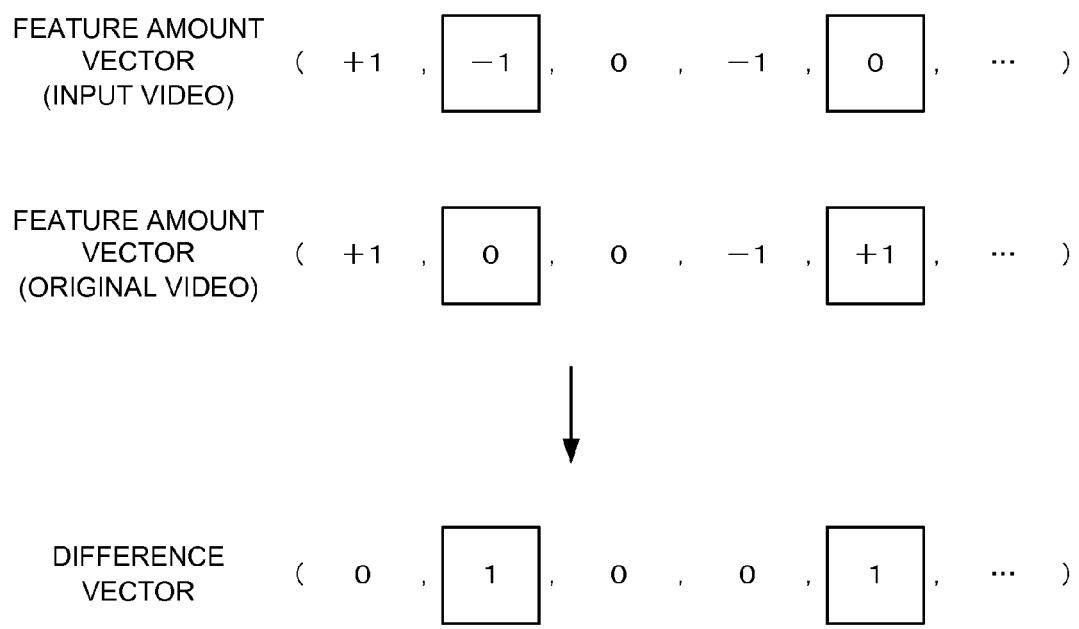
FIG. 8 is a diagram showing an example of generation of a difference vector by the difference information generating unit.

FIG. 8 is a diagram showing an example of generation of a difference vector by the difference information generating unit 22. In the difference vector example shown in FIG. 8, between the feature amount vector of the input video and the feature amount vector of the original video, dimensions with the same feature amount are denoted by "0" and dimensions with different feature amounts are denoted by "1". In other words, a difference vector is a set of difference region information of the respective dimensions. Moreover, the difference vector shown in FIG. 7 is merely an example and different values in accordance with a magnitude of difference in feature amounts may be set to the respective dimensions of a difference vector.

Figures 9, 10:
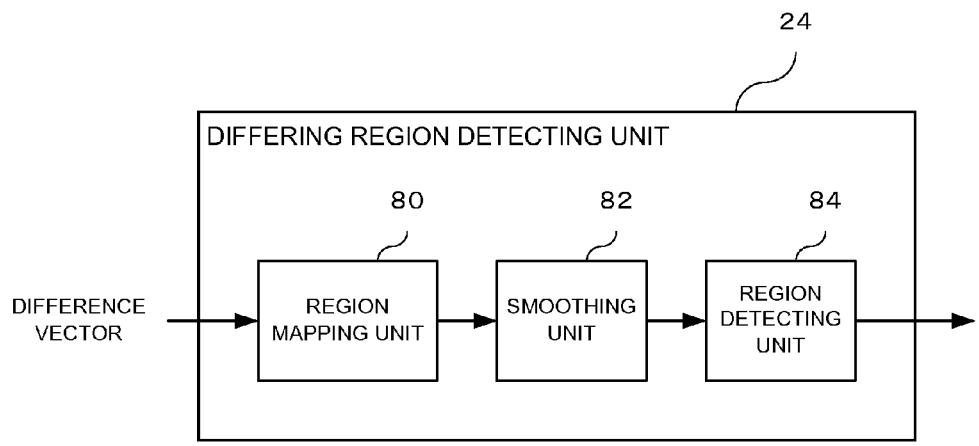
FIG. 9 is a diagram showing an example of a difference vector stored in a difference information generating unit.
FIG. 10 is a diagram showing a configuration example of a differing region detecting unit.

FIG. 9 is a diagram showing an example of a difference vector stored in the difference information storing unit 23. As shown in FIG. 9, a difference vector is stored in association with video identifiers of an input video and an original video as well as sequence information. As shown in FIG. 9, video identifiers or sequence information may differ between an input video and an original video. In addition, sequence information of the input video or the original video need not be contiguous.

Moreover, in the present embodiment, while a difference vector is used as difference information between feature amount vectors of an input video and an original video, the difference information need not necessarily be a vector as long as a difference in feature amounts for each subregion between frame images of the input video and the original video can be distinguished. In addition, while respective elements of a difference vector are denoted by "0" or "1" in the present embodiment, values in accordance with a difference in feature amounts may be used instead.

Returning to FIG. 1, the differing region detecting unit 24 detects a differing region in an input video and an original video judged to have identity based on a difference vector stored in the difference information storing unit 23 and stores detection information indicating the detection result in the detection information storing unit 25.

FIG. 10 is a diagram showing a configuration example of the differing region detecting unit 24. The differing region detecting unit 24 can be configured so as to comprise a region mapping unit 80, a smoothing unit 82, and a region detecting unit 84.

Figure 11:
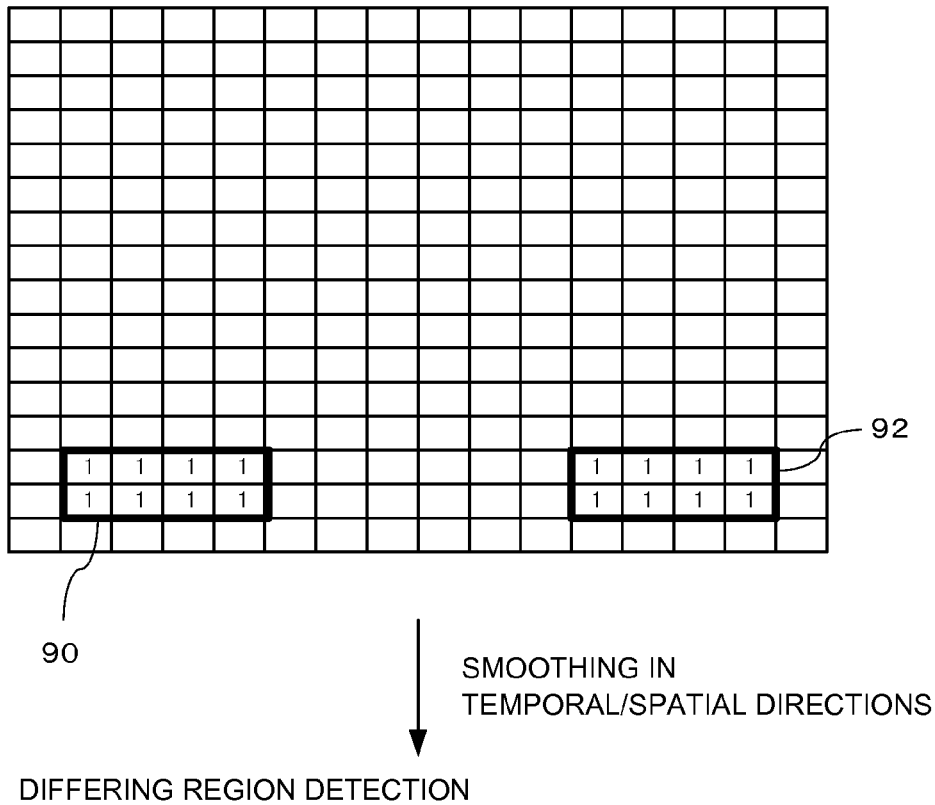
FIG. 11 is a diagram showing an example of difference value mapping and differing region detection.
Figure 11:
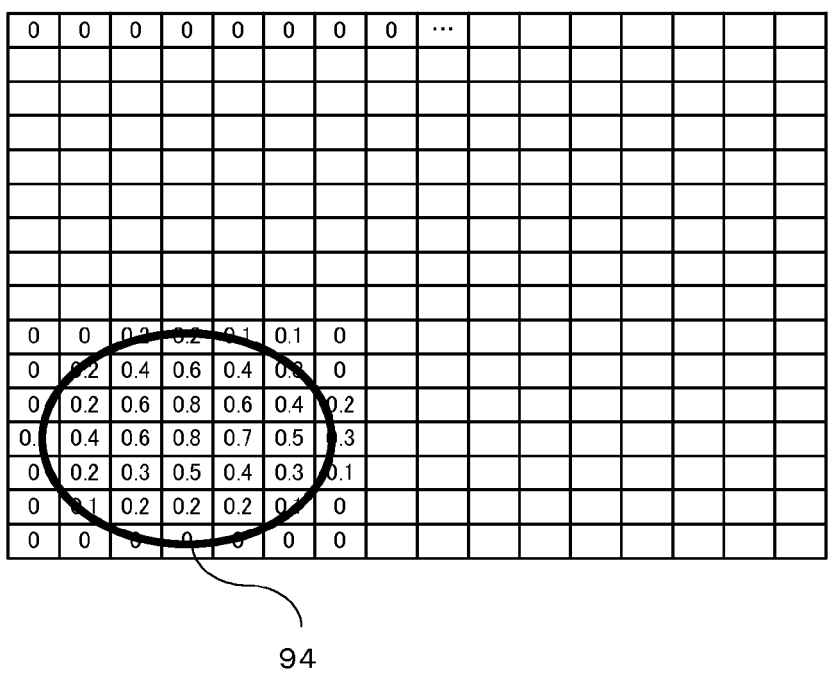

The region mapping unit 80 refers to a difference vector and maps a difference in feature amounts between frame images of an input video and an original video to a corresponding subregion for each dimension. For example, a dimension with a value of "1" of a difference vector indicates that the feature amounts in a subregion corresponding to the dimension differ between the input video and the original video. In addition, for example, if the subregions corresponding to the dimension are subregions 90 and 92 shown in an upper part of FIG. 11, the region mapping unit 80 (allocating unit) adds, for example, "1" to a difference value of each region in the subregions 90 and 92. The region mapping unit 80 performs such a mapping process on all dimensions with a difference in feature amounts.

A difference value of each region generated by mapping performed by the region mapping unit 80 is smoothed by the smoothing unit 82 between frame images and within frame images or, in other words, in temporal and spatial directions. An example of a smoothed difference value is shown in a lower part of FIG. 11.

Based on the smoothed difference value, the region detecting unit 84 detects a differing region between the input video and the original video, and stores detection information indicating the detection result in the detection information storing unit 25. For example, as shown in the lower part of FIG. 11, the region detecting unit 84 is capable of detecting, as a differing region, a region 94 in which the difference value smoothed in temporal and spatial directions projects (hereinafter, a projecting region). In this case, for example, the projecting region may be a region having a greater difference value than an average difference value of all regions. In addition, the region detecting unit 84 may be configured so as to detect the projecting region as a differing region when a size of the projecting region is greater than a value set in advance. Alternatively, the region detecting unit 84 may detect the projecting region as a differing region when a position of a center of gravity of the projecting region is within a region set in advance. Moreover, the value or the region set in advance for detecting a differing region need not necessarily be fixed and may vary in accordance with, for example, an average difference value.

While the present embodiment is configured so that a differing region between videos is detected by smoothing difference values mapped in each frame image constituting the videos over a plurality of frames, a differing region between frame images can be detected to a certain degree even when using only difference values between a pair of frame images.

In addition, in the present embodiment, while a uniform value is added to a difference value of a region corresponding to a dimension with a difference in feature amounts regardless of the region or the dimension, the value added to difference values may vary according to the region or the dimension. For example, when a feature amount vector extracted by the feature amount extracting unit 20 has a characteristic for making an identity judgment between videos while a central region of a frame image is more heavily weighted than a surrounding region thereof, each region or dimension may be weighted separately so that a difference in the surrounding region is given greater consideration than a difference in the central region when detecting a differing region.

FIG. 12 is a diagram showing an example of detection information stored in the detection information storing unit 25. As shown in FIG. 12, the detection information includes information related to a differing region in which a local modification has been detected. Specifically, in the example shown in FIG. 12, the detection information includes video identifiers of an input video and an original video, segment information, differing region information, difference information, and similarity information. In this case, segment information is information indicating a video segment and, for example, a playback time or a frame number of the segment in the video can be used. In addition, differing region information is information indicating a position of a detected differing region and, for example, information indicating regions included in the differing region among the split regions shown in FIG. 3 can be used. Furthermore, difference information is information indicating a degree of difference between videos in the differing region. Moreover, while only one numerical value is shown in FIG. 12 as difference information related to each segment, information indicating a variation in difference in each segment can also be used. In addition, similarity information is information indicating a similarity between an input video and an original video judged to have identity. For example, the similarity information can be outputted when the feature amount comparing unit 70 compares feature amount vectors.

Returning to FIG. 1, the detection result output unit 26 outputs information indicating a differing region between an input video and an original video based on the difference vector stored in the difference information storing unit 23 and the detection information stored in the detection information storing unit 25. Examples of output of information related to a differing region will be described with reference to FIGS. 13 to 18.

Figure 13:
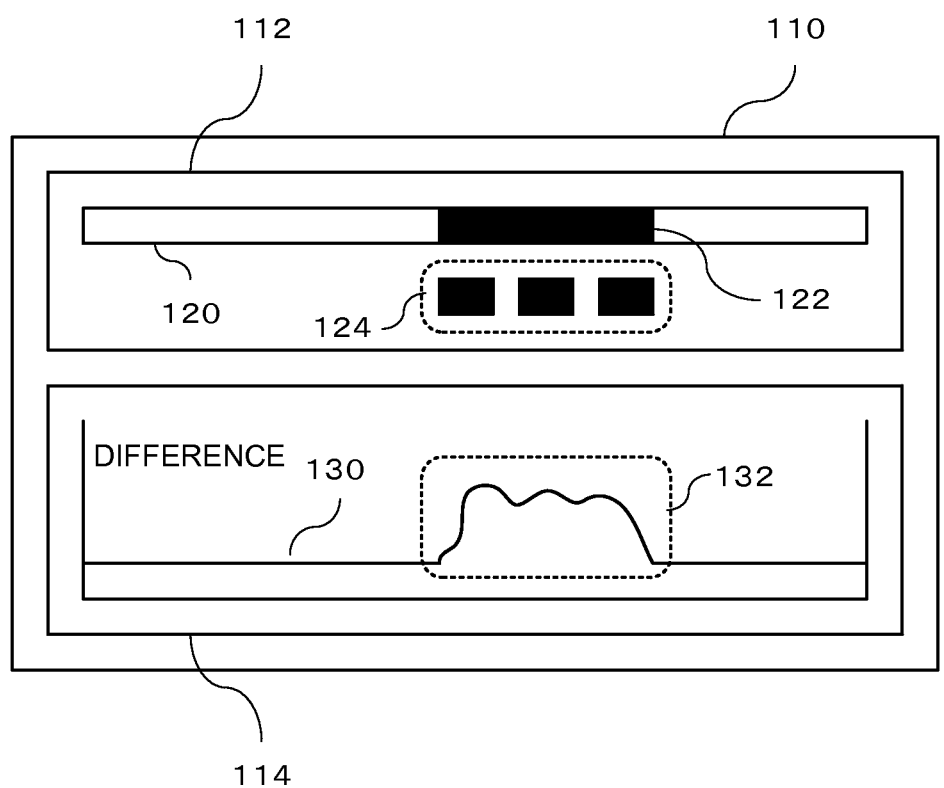
FIG. 13 shows an example of a screen which identifiably displays a segment in which a local modification has been detected.

As shown in FIG. 13, the detection result output unit 26 is capable of displaying a segment in which a local modification has been detected. A screen 110 includes a region 112 for displaying a video timeline and a region 114 for displaying a difference between videos.

In the example shown in FIG. 13, a timeline 120 of a video is displayed in the region 112 and a segment 122 in which a differing region has been detected is displayed on the timeline 120. Furthermore, thumbnail images 124 in the segment 122 are displayed below the segment 122 in which a differing region has been detected. In this case, for example, the detection result output unit 26 can display the thumbnail images 124 by referring to the video DB 32. In addition, the differing region detecting unit 24 may be configured so as to include, in detection information, a thumbnail image of the input video in a segment in which a differing region has been detected. In this case, the detection result output unit 26 is able to use the thumbnail image included in the detection information without having to refer to the video DB 32.

Furthermore, in the example shown in FIG. 13, a graph 130 representing difference is displayed in the region 114. A time axis that is an abscissa of the graph 130 is consistent with a time axis of the timeline 120. Therefore, as shown in FIG. 13, a segment 132 with a high difference in the graph 130 and the segment 122 in which a differing region has been detected and which is displayed on the timeline 120 are in a same time slot.

As shown, displaying the timeline 120 and the graph 130 representing difference enables easy confirmation regarding in which segment a differing region has been detected. In addition, displaying the thumbnail images 124 enables confirmation regarding in which scene of a video the difference had occurred. Moreover, while the regions 112 and 114 are displayed in the screen 110 shown in FIG. 13, only one of the regions may be displayed.

Figure 14:
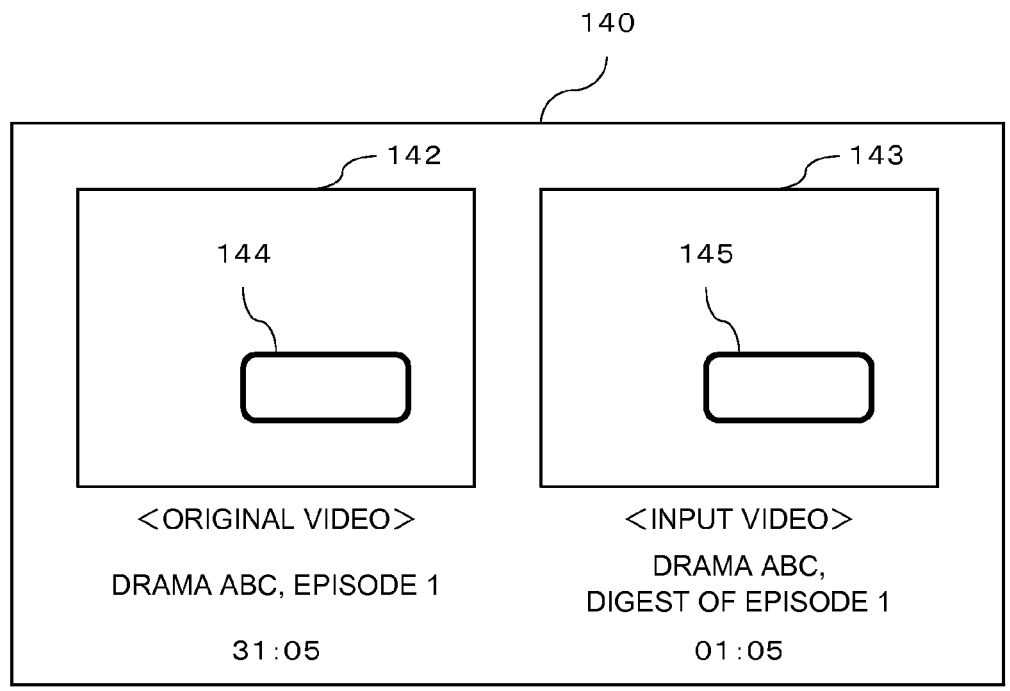
FIG. 14 shows an example of a screen which identifiably displays a position of a differing region.

In the screen shown in FIG. 13, when the segment 122 or the segment 132 indicating segments in which a differing region has been detected or the thumbnail images 124 are selected by a click or the like, the detection result output unit 26 outputs a screen 140 shown in FIG. 14.

The screen 140 includes regions 142 and 143 which display the original video and the input video in the selected segment. The detection result output unit 26 acquires segment information of the selected segment from the detection information, plays back the original video in the segment from the video DB 32 and displays the original video in the region 142, and displays the input video in the segment in the region 143. Moreover, it is assumed that the input video is stored in a predetermined storage area (input video storing unit) located inside or outside the differing region detection system 10.

Figure 15:
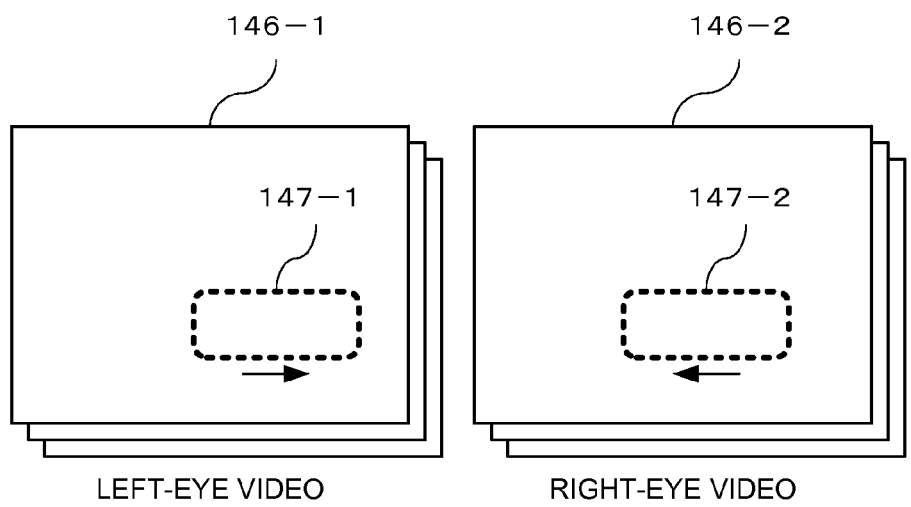
FIG. 15 shows an example of a screen which identifiably three-dimensionally displays a position of a differing region.

In addition, as shown in FIG. 14, the detection result output unit 26 is capable of displaying frames 144 and 145 which indicate a position of the detected differing region on the videos displayed in the regions 142 and 143. Moreover, the display of "frames" is merely an example and any display method for facilitating identification of a position of a differing region can be adopted. For example, as shown in FIG. 15, the detection result output unit 26 may output a three-dimensional video for enabling a position of a differing region to be identifiable. FIG. 15 shows videos 146-1 and 146-2 displayed in the region 142 shown in FIG. 14. The video 146-1 is a left-eye video, and a region indicated by the frame 144 in FIG. 14 has been moved rightward to be displayed in a region 147-1. In addition, the video 146-2 is a right-eye video, and a region indicated by the frame 144 in FIG. 14 has been moved leftward to be displayed in a region 147-2. By having the videos 146-1 and 146-2 respectively displayed as a left-eye video and a right-eye video in the region 142 shown in FIG. 14, a differing region can be stereoscopically displayed. Videos displayed in the region 143 can be stereoscopically displayed in a similar manner.

As described above, by displaying videos so that a position of a differing region is identifiable, it is no longer necessary to visually compare all regions in the videos displayed in the regions 142 and 143 when confirming a difference between the videos, and since it suffices to only compare regions displayed so that the position of the differing region is identifiable, work load can be reduced.

In addition, there may be cases where an input video has a plurality of corresponding original videos as source candidates. In such a case, the detection result output unit 26 is capable of estimating a source original video and displaying a segment in which a local modification has occurred between the estimated original video and the input video. For example, the detection result output unit 26 can display a screen such as that shown in FIG. 16.

Figure 16:
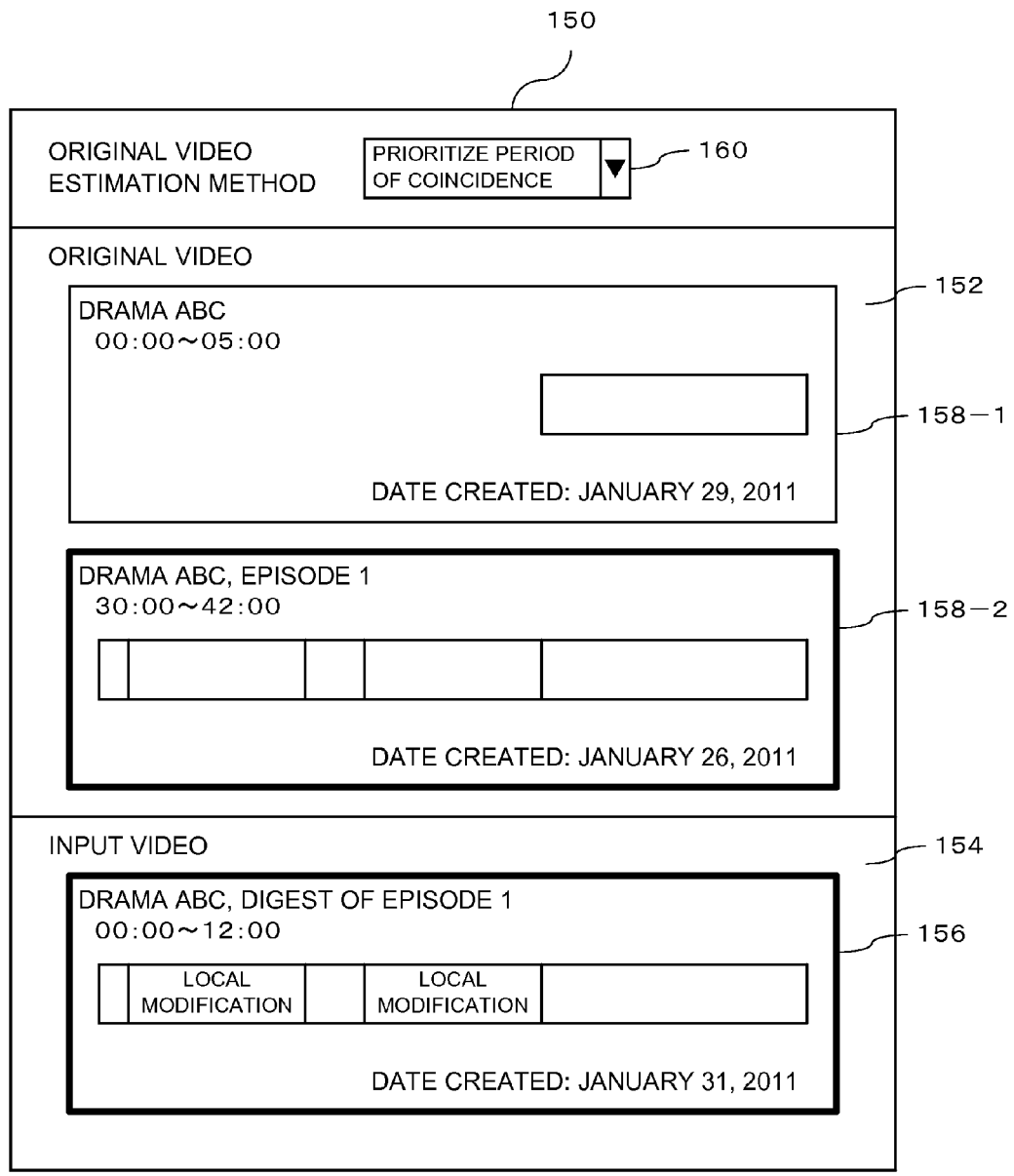
FIG. 16 shows an example of an output screen of a detection result of a differing region in a case where there is a plurality of original videos as source candidates.

A screen 150 shown in FIG. 16 includes a region 152 which displays information related to original videos that are source candidates and a region 154 which displays information related to an input video. As shown in FIG. 16, a region 156 which displays information related to the input video is provided in the region 154. In addition, regions 158-1 and 158-2 which display information related to two original videos that are source candidates of the input video are provided in the region 152.

When there is a plurality of original videos that are source candidates as described above, the detection result output unit 26 estimates a source original video based on detection information stored in the detection information storing unit 25 and information stored in the feature amount DB 30. A method of estimating a source original video can be selected using, for example, a list box 160 or the like such as that shown in FIG. 16. The detection result output unit 26 estimates a source original video from the plurality of original videos according to the selected method. Examples of source estimation methods include a method which gives a higher priority to videos with a longer period of coincidence with the input video or, in other words, a longer period that is judged to have identity with the input video, a method which gives a higher priority to videos having a greater similarity with the input video, and a method which gives a higher priority to videos with no discrepancy in a chronological order of creation dates/times with respect to the input video. Moreover, for a similarity with the input video, for example, similarity information stored in the detection information storing unit 25 can be used.

In the example shown in FIG. 16, a period of coincidence with the input video is selected as the source estimation method. In this case, the period of coincidence between the original video shown in the region 158-1 and the input video is 5 minutes, and the period of coincidence between the original video shown in the region 158-2 and the input video is 12 minutes. Therefore, the detection result output unit 26 estimates the original video shown in the region 158-2 to be the source and displays the estimated source original video so as be identifiable by, for example, highlighting the region 158-2.

In addition, the detection result output unit 26 identifiably displays a segment in the input video in which a local modification has been made to the estimated source original video. For example, as shown in FIG. 16, the detection result output unit 26 displays the timelines of the original video and the input video so that respective time axes are consistent with each other, and displays a segment in which a local modification has been made to the estimated source on the timeline of the input video. Furthermore, as shown in FIG. 16, the detection result output unit 26 is capable of displaying that the modification is a "local modification" in addition to displaying the segment in which the local modification has been made.

In addition, when the segment in which the local modification has been made is selected by a click or the like in the screen 150 shown in FIG. 16, the detection result output unit 26 outputs the screen 140 shown in FIG. 14 and displays an input video and an original video in the selected segment.

Figure 17:
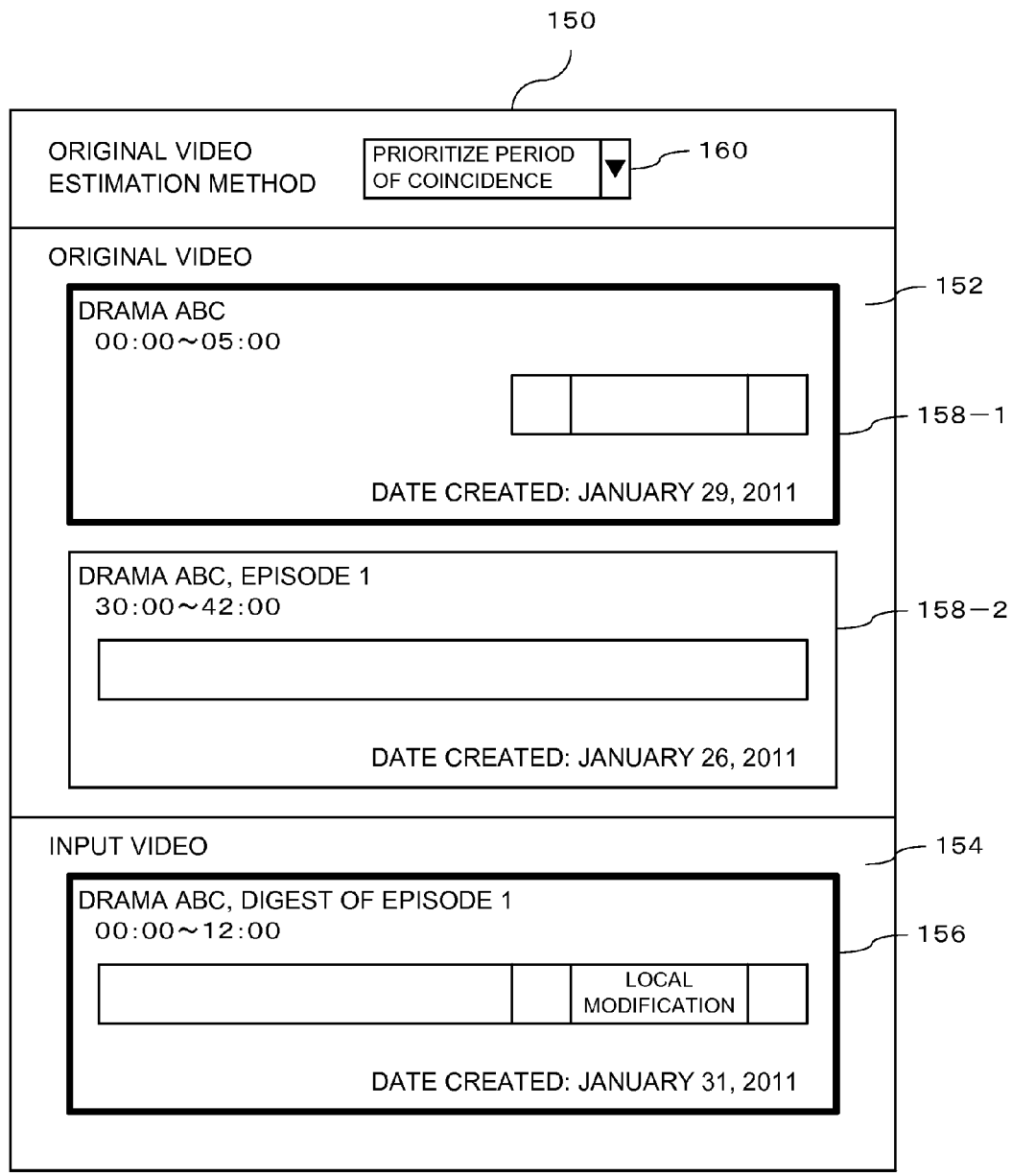
FIG. 17 shows an example of an output screen of a detection result of a differing region in a case where there is a plurality of original videos as source candidates.

Furthermore, when another estimation method is selected using the list box 160 or the like in the screen 150 shown in FIG. 16, the detection result output unit 26 displays a segment in which a local modification has occurred between the source original video estimated by the selected estimation method and the input video. In addition, when another original video is selected by a click or the like in the screen 150 instead of a change in estimation methods, the detection result output unit 26 similarly displays a segment in which a local modification has occurred by using the selected original video as a source. For example, when the region 158-1 is selected by a click or the like in in the screen 150 shown in FIG. 16, a segment in which a local modification has occurred is displayed by using the original video displayed in region 158-1 as a source as shown in FIG. 17.

As described above, when there is a plurality of original videos that are source candidates of an input video, a segment in which a local modification has occurred between an original video that is estimated to be a source and the input video can be displayed. In addition, by selecting the displayed segment, the video in the segment can be confirmed. Therefore, when there is a plurality of original videos that are source candidates of an input video, the work load for confirming contents of the modification can be reduced.

In addition, when displaying the segment in which a local modification has occurred between the original video that is estimated to be a source and the input video, the detection result output unit 26 is capable of more clearly showing in which shot the modification had occurred. For example, the detection result output unit 26 can display a screen such as that shown in FIG. 18.

Figure 18:
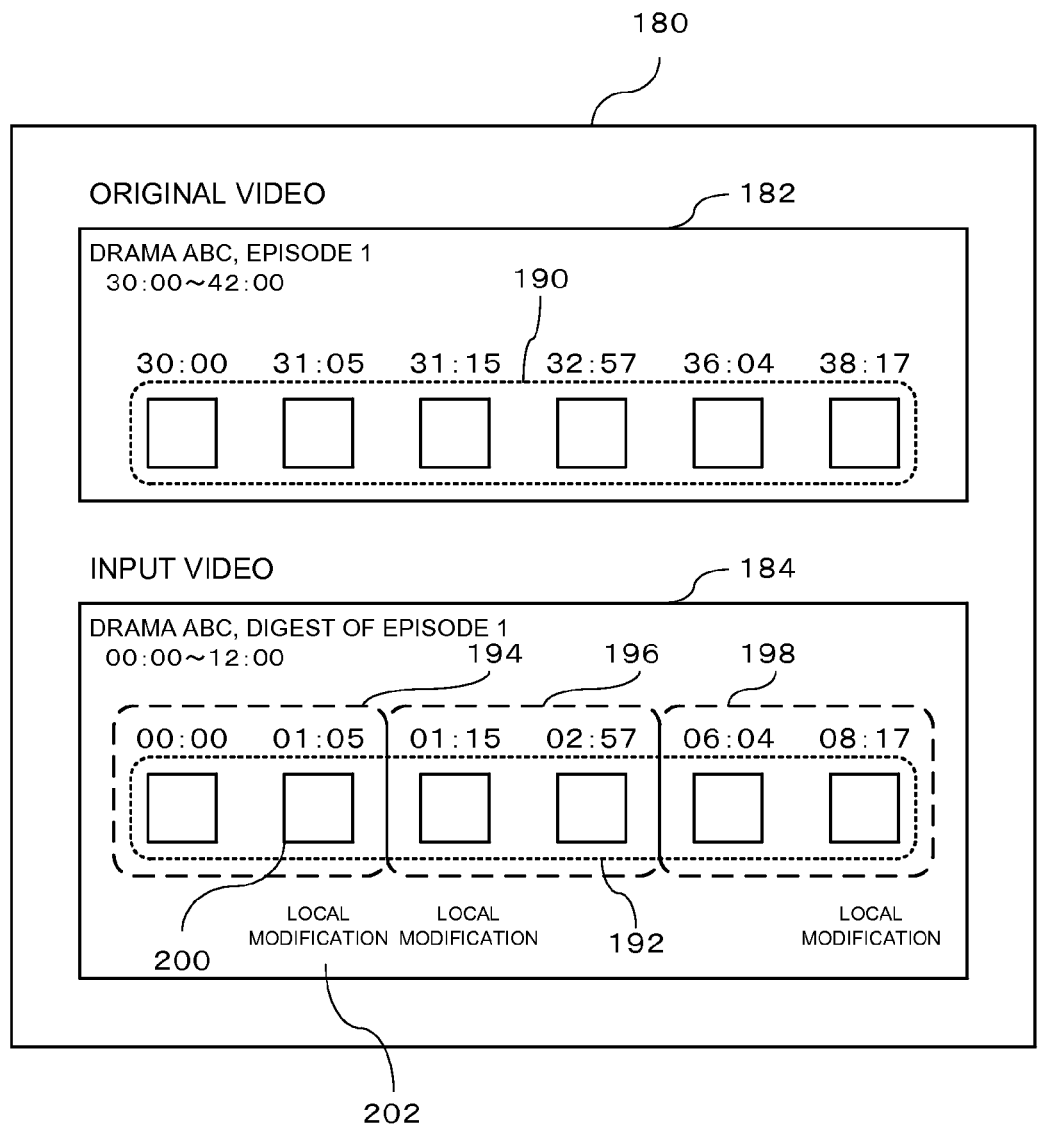
FIG. 18 shows an example of an output screen in a case where shop splitting is performed in consideration of a local modification.

A screen 180 shown in FIG. 18 includes a region 182 which displays information related to an original video and a region 184 which displays information related to an input video. As shown in FIG. 18, thumbnail images 190 of the original video are displayed in the region 182 and thumbnail images 192 of the input video are displayed in the region 184. In this case, for example, a general method of generating thumbnail images involves splitting a target video into shots. The shot splitting can be performed by, for example, detecting a timing at which a feature amount vector varies significantly in a frame image included in a video. Subsequently, a thumbnail image is generated from a representative frame image in each shot.

However, since a timing of such shot splitting often differs from a timing at which a local modification is made in a video, simply displaying a thumbnail image for each shot may not be sufficient for assessing contents of the modification.

In consideration thereof, with a shot in which a local modification has been detected among shots split by a general method, the detection result output unit 26 can further perform shot splitting in accordance with a presence/absence of a local modification to generate a thumbnail image.

For example, let us assume that in the screen shown in FIG. 18, three shots 194, 196, and 198 are produced as a result of shot splitting performed by a general method. As shown in FIG. 18, assuming that a local modification has been detected in each shot, by further performing shot splitting in accordance with a presence/absence of a local modification in each shot, the detection result output unit 26 is capable of generating a shot that coincides with a timing at which the local modification has been made. In addition, for example, the detection result output unit 26 is capable of displaying a thumbnail image 200 of a shot at the timing at which the local modification has been made. Furthermore, the detection result output unit 26 can display information 202 that is capable of identifying that a "local modification" has occurred in the segment together with the thumbnail image 200 of the shot at the timing at which the local modification has been made. The same applies for the other shots 196 and 198.

Moreover, a general shot splitting process may be performed before input to the differing region detection system 10. Alternatively, a general shot splitting process may be performed by a shot splitting unit provided inside the differing region detection system 10.

As described above, by further performing shot splitting according to the presence/absence of a local modification on the inside of a shot in which a local modification has occurred, an assessment regarding in which shot the modification has occurred can be made more readily. Accordingly, the work load when confirming modification contents can be reduced.

Figure 19:
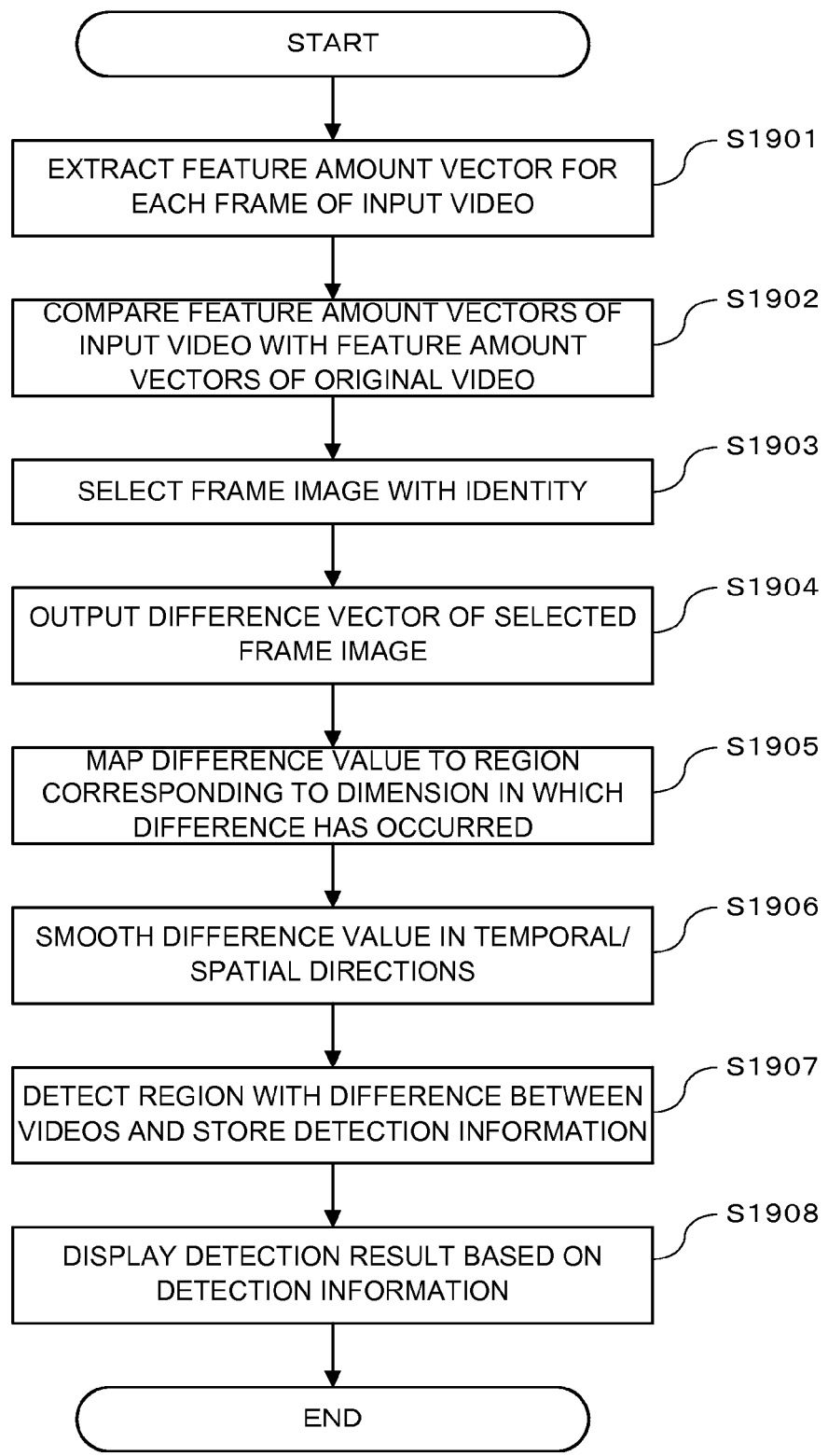
FIG. 19 is a flow chart showing an example of a differing region detecting process.

FIG. 19 is a flow charting an example of a differing region detecting process according to the differing region detection system 10. First, the feature amount extracting unit 20 extracts a feature amount vector for each frame image in an input video and stores the feature amount vectors in the feature amount storing unit 21 (S1901).

The feature amount comparing unit 70 compares the feature amount vector of the input video stored in the feature amount storing unit 21 with a feature amount vector of an original video stored in the feature amount DB 30 (S1902). The frame selecting unit 72 selects a frame image having identity based on a result of the comparison by the feature amount comparing unit 70 (S1903). In addition, the difference information output unit 74 stores a difference vector for the selected frame image in the difference information storing unit 23 (S1904).

The region mapping unit 80 maps the difference value to a region corresponding to a dimension in which a difference in feature amounts has occurred based on the difference vector stored in the difference information storing unit 23 (S1905). The smoothing unit 82 smooths the mapped difference value in temporal and spatial directions (S1906). In addition, based on the smoothed difference value, the region detecting unit 84 detects a differing region between the input video and the original video, and stores detection information in the detection information storing unit 25 (S1907).

Finally, based on the detection information stored in the detection information storing unit 25, the detection result output unit 26 outputs information indicating a differing region between the input video and the original video having identity (S1908).

This concludes the description of the differing region detection system 10 according to the present embodiment. With the differing region detection system 10, by mapping a difference in feature amounts for each dimension of a feature amount vector to a subregion corresponding to each dimension instead of simply comparing distances between feature amount vectors, a differing region between videos with identity can be detected.

In addition, with the differing region detection system 10, a segment with identity between compared videos can be specified and a differing region in the specified segment can be detected.

Furthermore, with the differing region detection system 10, since a difference value mapped to a subregion corresponding to a dimension with values that differ in a difference vector is smoothed in temporal and spatial directions, a differing region can be detected with high precision.

Moreover, with the differing region detection system 10, a differing region can be detected while taking a weight set to each dimension or each region in a difference vector into consideration. For example, when a feature amount vector used to judge identity more greatly reflects a feature amount in a central portion in an image region as compared to a surrounding portion, the weight of a region in the surrounding portion may be increased when detecting a differing region. For example, since telops are often added to a lower portion of an image region, increasing weight of a region in the lower portion is effective when detecting a differing region between videos with a difference in telops. In addition, for example, a difference in an outermost circumferential portion of an image region is likely to increase even when there is identity but no local difference between videos. Therefore, weight of the outermost circumferential portion of the image region may be reduced.

In addition, with the differing region detection system 10, a position of a detected differing region can be displayed so as to be identifiable. Accordingly, a user can readily confirm the position of a differing region between videos with identity.

Furthermore, with the differing region detection system 10, a segment in which a differing region has occurred in a video can be displayed so as to be identifiable. Therefore, when confirming contents that differ between videos, since a user need only confirm videos of the segment instead of entire videos, work load can be reduced.

It should be noted that the present embodiment is for facilitating understanding of the present invention and is not for limiting the interpretation of the present invention. Various modifications and changes may be made to the present invention without departing from the spirit and scope thereof, and equivalents are to be included in the present invention.

The present application claims priority on the basis of Japanese Patent Application No. 2011-027429 filed on Feb. 10, 2011, the entire contents of which are incorporated herein by reference.

While the present invention has been described with reference to an embodiment, the present invention is not intended to limit the embodiment described above. Various modifications to configurations and details of the present invention will occur to those skilled in the art without departing from the scope of the present invention.

A part of or all of the present embodiment may also be described as, but not limited to, the appendices provided below.

(Appendix 1) A differing region detection system, comprising: a difference information generating unit configured to generate inter-image difference information indicating a difference in feature amounts for each subregion between first and second images based on a first feature amount vector that is a set of feature amounts respectively corresponding to a plurality of subregions in the first image and a second feature amount vector that is a set of feature amounts respectively corresponding to a plurality of subregions in the second image; and a differing region detecting unit configured to detect a differing region that is an image region that differs between the first and second images, based on differences in the respective subregions indicated by the inter-image difference information, and output detection information indicating a result of the detection.

(Appendix 2) The differing region detection system according to Appendix 1, wherein the subregions include at least one split region, and the differing region detecting unit is configured to detect the differing region with the split region as a unit by allocating a difference value in accordance with the difference to each split region in each subregion based on the inter-image difference information.

(Appendix 3) The differing region detection system according to Appendix 1, wherein the first image is a first frame image constituting a first video, the second image is a second frame image constituting a second video and corresponding to the first frame image, the difference information generating unit is configured to generate the inter-image difference information for a plurality of pairs of the first and second images, and the differing region detecting unit is configured to detect the differing region in the first and second videos based on the inter-image difference information for the plurality of pairs of the first and second images.

(Appendix 4) The differing region detection system according to Appendix 3, wherein the subregions include at least one split region, and the differing region detecting unit is configured to: allocate a difference value in accordance with the difference to each split region in each subregion based on the inter-image difference information; and detect the differing region with the split region as a unit by smoothing the difference value for the plurality of pairs of the first and second images between frame images.

(Appendix 5) The differing region detection system according to Appendix 3 or 4, wherein the differing region detecting unit is configured to detect the differing region by smoothing the difference value for the plurality of pairs of the first and second images between frame images.

(Appendix 6) The differing region detection system according to any one of Appendices 3 to 5, wherein the difference information generating unit is configured to: select a plurality of pairs of the first and second images in which a difference in feature amount vectors is smaller than a predetermined criterion based on a plurality of the first feature amount vectors and a plurality of the second feature amount vectors; and output the inter-image difference information for the selected plurality of pairs.

(Appendix 7) The differing region detection system according to any one of Appendices 3 to 6, wherein the differing region detecting unit is configured to detect the differing region based on a weight set for each of the subregions and the difference value for the plurality of pairs of the first and second images.

(Appendix 8) The differing region detection system according to any one of Appendices 3 to 7, wherein the difference information generating unit is configured to select a plurality of pairs of the first and second images among the first video and one second video among the plurality of second videos, based on the plurality of first feature amount vectors of the first video and the plurality of second feature amount vectors of each of the plurality of second videos.

(Appendix 9) The differing region detection system according to Appendix 8, wherein the difference information generating unit is configured to select a plurality of pairs of the first and second images among one first video among the plurality of first videos and one second video among the plurality of second videos, based on the plurality of first feature amount vectors of each of the plurality of first videos and the plurality of second feature amount vectors of each of the plurality of second videos.

(Appendix 10) The differing region detection system according to any one of Appendices 1 to 9, further comprising a detection result output unit configured to identifiably display a position of the differing region between the first and second images based on the detection information.

(Appendix 11) The differing region detection system according to any one of Appendices 3 to 9, further comprising a detection result output unit configured to identifiably display a position of the differing region between the first and second videos based on the detection information.

(Appendix 12) The differing region detection system according to Appendix 11, wherein the differing region detecting unit is configured to include information indicating a segment in which the differing region has been detected between the first and second videos in the detection information and output the information, and the detection result output unit is configured to identifiably display the segment in which the differing region has been detected based on the detection information.

(Appendix 13) The differing region detection system according to Appendix 11 or 12, wherein the differing region detecting unit is configured to include information indicating a degree of difference in the differing region in the detection information and output the information, and the detection result output unit is configured to identifiably display the degree of difference in the differing region based on the detection information.

(Appendix 14) The differing region detection system according to Appendix 12, wherein in response to a user input for selecting a segment in which the differing region has been detected, the detection result output unit is configured to display the first and second videos in that segment.

(Appendix 15) A differing region detection method, comprising the steps of: generating inter-image difference information indicating a difference in feature amounts for each sub-region between first and second images based on a first feature amount vector that is a set of feature amounts respectively corresponding to a plurality of subregions in the first image and a second feature amount vector that is a set of feature amounts respectively corresponding to a plurality of subregions in the second image; and detecting a differing region that is an image region that differs between the first and second images, based on differences in the respective subregions indicated by the inter-image difference information and outputting detection information that indicates a result of the detection.

10 differing region detection system
20 feature amount extracting unit
21 feature amount storing unit
22 difference information generating unit
23 difference information storing unit
24 differing region detecting unit
25 detection information storing unit
26 detection result output unit
30 feature amount database
32 video database
70 feature amount comparing unit
72 frame selecting unit
74 difference information output unit
80 region mapping unit
82 smoothing unit
84 region detecting unit

We claim:

1. A differing region detection system, comprising:
at least one memory operable to store program instructions;
at least one processor operable to read the stored program instructions; and
according to the stored program instructions, the at least one processor is configured to be operated as:
a difference information generating unit configured to generate inter-image difference information indicating a difference in feature amounts for each sub region between a first image and a second image that has been judged to have identity with the first image, based on a first feature amount vector that is a set of feature amounts respectively corresponding to a plurality of subregions in the first image and a second feature amount vector that is a set of feature amounts respectively corresponding to a plurality of subregions in the second image;
a differing region detecting unit configured to detect a differing region that is an image region that differs between the first image and the second image, based on differences in the respective subregions indicated by the inter-image difference information, and output detection information indicating a result of the detection; and
a detection result output unit configured to identifiably display a position of the differing region between the first image and the second image based on the detection information;
wherein the subregions include at least one split region, and
the differing region detecting unit is further configured to detect the differing region with the split region as a unit by allocating a difference value in accordance with the difference to each split region in each sub region based on the inter-image difference information.

2. The differing region detection system according to claim 1, wherein
the first image is a first frame image constituting a first video,
the second image is a second frame image constituting a second video and corresponding to the first frame image,
the difference information generating unit is configured to generate the inter-image difference information for a plurality of pairs of the first image and the second image, and
the differing region detecting unit is configured to detect the differing region in the first and second videos based on the inter-image difference information for the plurality of pairs of the first image and the second image.

3. The differing region detection system according to claim 2, wherein
the subregions include at least one split region, and
the differing region detecting unit is configured to:
allocate a difference value in accordance with the difference to each split region in each sub region based on the inter-image difference information; and
detect the differing region with the split region as a unit by smoothing the difference value for the plurality of pairs of the first image and the second image between frame images.

4. The differing region detection system according to claim 2, wherein
the differing region detecting unit is configured to detect the differing region by smoothing the difference value for the plurality of pairs of the first image and the second image between frame images.

5. The differing region detection system according to any one of claim 2, wherein
the difference information generating unit is configured to:
select a plurality of pairs of the first image and the second image in which a difference in feature amount vectors is smaller than a predetermined criterion based on a plurality of the first feature amount vectors and a plurality of the second feature amount vectors; and
output the inter-image difference information for the selected plurality of pairs.

6. The differing region detection system according to claim 2, wherein
the differing region detecting unit is configured to detect the differing region based on a weight set for each of the subregions and the difference value for the plurality of pairs of the first image and the second image.

7. The differing region detection system according to claim 2, wherein
the difference information generating unit is configured to select a plurality of pairs of the first image and the second image among the first video and one second video among the plurality of second videos, based on the plurality of first feature amount vectors of the first video and the plurality of second feature amount vectors of each of the plurality of second videos.

8. The differing region detection system according to claim 7, wherein
the difference information generating unit is configured to select a plurality of pairs of the first image and the second image among one first video among the plurality of first videos and one second video among the plurality of second videos, based on the plurality of first feature amount vectors of each of the plurality of first videos and the plurality of second feature amount vectors of each of the plurality of second videos.

9. The differing region detection system according to claim 1, wherein the detection result output unit is configured to identifiably display a position of the differing region between the first and second videos based on the detection information.

10. The differing region detection system according to claim 9, wherein
the differing region detecting unit is configured to include information indicating a segment in which the differing region has been detected between the first and second videos in the detection information and output the information, and
the detection result output unit is configured to identifiably display the segment in which the differing region has been detected based on the detection information.

11. The differing region detection system according to claim 9, wherein
the differing region detecting unit is configured to include information indicating a degree of difference in the differing region in the detection information and output the information, and
the detection result output unit is configured to identifiably display the degree of difference in the differing region based on the detection information.

12. The differing region detection system according to claim 10, wherein
in response to a user input for selecting a segment in which the differing region has been detected, the detection result output unit is configured to display the first and second videos in that segment.

13. A differing region detection method, performed by at least one processor according to program instructions stored in at least one memory, comprising the steps of:
generating inter-image difference information indicating a difference in feature amounts for each sub region between a first image and a second image that has been judged to have identity with the first image based on a first feature amount vector that is a set of feature amounts respectively corresponding to a plurality of subregions in the first image and a second feature amount vector that is a set of feature amounts respectively corresponding to a plurality of subregions in the second image;
detecting a differing region that is an image region that differs between the first and second images, based on differences in the respective subregions indicated by the inter-image difference information and outputting detection information that indicates a result of the detection;
identifiably displaying a position of the differing region between the first and second images based on the detection information;
wherein the subregions include at least one split region;
wherein the detecting detects the differing region with the split region as a unit by allocating a difference value in accordance with the difference to each split region in each sub region based on the inter-image difference information.

* * * * *